US009512527B2

(12) United States Patent
Matsunaga et al.

(10) Patent No.: US 9,512,527 B2
(45) Date of Patent: Dec. 6, 2016

(54) REINFORCED POROUS METAL FOIL AND PROCESS FOR PRODUCTION THEREOF

(75) Inventors: Tetsuhiro Matsunaga, Ageo (JP); Joe Nishikawa, Ageo (JP); Hajime Watanabe, Ageo (JP)

(73) Assignee: Mitsui Mining & Smelting Co., Ltd., Shinagawa-Ku (JP)

( * ) Notice: Subject to any disclaimer, the term of this patent is extended or adjusted under 35 U.S.C. 154(b) by 283 days.

(21) Appl. No.: 13/882,530

(22) PCT Filed: Jan. 6, 2012

(86) PCT No.: PCT/JP2012/050189
§ 371 (c)(1),
(2), (4) Date: Apr. 30, 2013

(87) PCT Pub. No.: WO2012/096233
PCT Pub. Date: Jul. 19, 2012

(65) Prior Publication Data
US 2013/0216849 A1    Aug. 22, 2013

(30) Foreign Application Priority Data

Jan. 13, 2011  (JP) ................................ 2011-005111

(51) Int. Cl.
*B32B 5/18* (2006.01)
*C25D 1/04* (2006.01)
(Continued)

(52) U.S. Cl.
CPC . *C25D 1/04* (2013.01); *C25D 1/08* (2013.01); *C25D 5/12* (2013.01); *H01G 11/06* (2013.01);
(Continued)

(58) Field of Classification Search
None
See application file for complete search history.

(56) References Cited

U.S. PATENT DOCUMENTS 5,030,233 A    7/1991  Ducheyne
5,496,650 A *  3/1996  Sugikawa ............. B22F 3/1103
                                             156/150
(Continued)

FOREIGN PATENT DOCUMENTS

CN    101557927 A    10/2009
EP     1 038 994 A1   9/2000
(Continued)

OTHER PUBLICATIONS

Japanese Office Action (Application No. 2011-005111) dated Aug. 13, 2014.
(Continued)

*Primary Examiner* — Daniel J Schleis
(74) *Attorney, Agent, or Firm* — Burr & Brown, PLLC

(57) ABSTRACT

A reinforced porous metal foil is provided including a porous portion comprising a two-dimensional network structure composed of a metal fiber and a reinforced portion which is substantially non-porous or less porous than the porous portion. The reinforced portion is composed of the same metal the metal fiber and is continuous and integral with the porous portion. Accordingly, it possible to provide a porous metal foil having superior properties at a low cost in a highly productive manner that is also suitable for continuous production.

14 Claims, 11 Drawing Sheets

(51) Int. Cl.
 *C25D 1/08* (2006.01)
 *H01G 11/06* (2013.01)
 *H01G 11/28* (2013.01)
 *H01G 11/70* (2013.01)
 *H01G 11/86* (2013.01)
 *H01M 4/66* (2006.01)
 *H01M 4/74* (2006.01)
 *H01M 4/80* (2006.01)
 *H01M 10/0525* (2010.01)
 *C25D 5/12* (2006.01)
 *C25D 3/06* (2006.01)

(52) U.S. Cl.
 CPC .............. *H01G 11/28* (2013.01); *H01G 11/70* (2013.01); *H01G 11/86* (2013.01); *H01M 4/661* (2013.01); *H01M 4/74* (2013.01); *H01M 4/806* (2013.01); *H01M 10/0525* (2013.01); *C25D 3/06* (2013.01); *Y02E 60/122* (2013.01); *Y02E 60/13* (2013.01); *Y02P 70/54* (2015.11); *Y02T 10/7011* (2013.01); *Y02T 10/7022* (2013.01); *Y10T 428/12014* (2015.01); *Y10T 428/12153* (2015.01); *Y10T 428/12361* (2015.01); *Y10T 428/12431* (2015.01)

(56) References Cited

U.S. PATENT DOCUMENTS 6,465,133 B1 * 10/2002 Kariya ..................... C25D 5/56
                                                    205/59
2004/0115536 A1 * 6/2004 Blankenborg et al. ........ 429/245
2010/0021695 A1 * 1/2010 Naoyuki et al. .............. 428/173
2011/0247859 A1   10/2011 Zagdoun et al.

FOREIGN PATENT DOCUMENTS

| GB | 2 320 724 A | | 7/1998 |
|----|---|---|---|
| JP | 10-195689 A1 | | 7/1998 |
| JP | 11-067222 A1 | | 3/1999 |
| JP | 2000-328284 A1 | | 11/2000 |
| JP | 3262558 B2 | | 3/2002 |
| JP | 2005-251429 A1 | | 9/2005 |
| WO | WO02/00966 | * | 1/2002 |
| WO | 2008/081904 A1 | | 7/2008 |
| WO | 2010/034949 A1 | | 4/2010 |

OTHER PUBLICATIONS

Korean Office Action (Application No. 10-2013-7014259) dated Jun. 24, 2014 (with English translation).
Chinese Office Action (With English Translation), Chinese Application No. 201280005334.7, dated Feb. 25, 2015 (18 pages).
International Search Report and Written Opinion dated Apr. 17, 2012 (with English translation).
Taiwanese Office Action (Application No. 101101247) dated Dec. 4, 2013 (with English translation).

* cited by examiner

REINFORCED POROUS METAL FOIL AND PROCESS FOR PRODUCTION THEREOF

CROSS-REFERENCE TO RELATED APPLICATION

This application claims priority to Japanese Patent Application No. 2011-5111 filed on Jan. 13, 2011, the entire content of which is incorporated herein by reference.

BACKGROUND OF THE INVENTION

1. Field of the Invention

The present invention relates to a reinforced porous metal foil and a method for producing the porous metal foil.

2. Description of Related Art

In recent years, lithium-ion secondary batteries and lithium-ion capacitors have been drawing attention as electric storage devices for use in mobile electronic devices such as mobile phones or laptop personal computers, electric vehicles, and hybrid vehicles. As anode current collectors for such electric storage devices, porous metal foils are used or are being considered for use. This is because making the foil porous provides benefits such that the volume and the weight of the foil can be reduced (to improve fuel consumption in automobiles), that adhesive power of an active material can be improved by anchoring effect making use of the pores, and that pre-doping of lithium ions (e.g., vertical pre-doping) can be efficiently conducted by making use of the pores.

Known methods for producing such porous metal foils include (1) a method of masking the surface of a substrate in a desired pattern with an insulating film, onto which electrolytic plating is conducted to form pores in accordance with the pattern; (2) a method of providing the surface of a substrate with a specific surface roughness or a specific surface condition, onto which electrolytic plating is conducted to control nucleation; (3) a method of perforating a non-porous metal foil by etching or machining; and (4) a method of forming a three-dimensional network structure by techniques for producing metal foams or plating nonwoven fabrics.

In particular, various techniques have been proposed for the above method of (2) since its steps are relatively simple and suitable for mass production. For example, Patent Literature 1 discloses a method for producing a fine-porous metal foil by subjecting a cathode having a surface roughness Rz of 0.8 μm or less to electrolytic plating. Patent Literature 2 discloses a method comprising forming an oxidized film on the surface of a cathode body made of titanium or a titanium alloy by anode oxidization method; electro-depositing copper on the surface of the cathode body to form a porous copper foil; and peeling the foil from the cathode body. Patent Literature 3 discloses a method for producing a porous metal foil provided with an aluminum alloy carrier, comprising forming even projections by etching aluminum; and gradually growing metal particles from the projections as nuclei for electro-deposition so as to connect the metal particles. Furthermore, as an example of the above method of (3), Patent Literature 4 discloses a current collector in which a large number of pores each having a diameter of 0.1 to 3 mm are formed by a punching process performed on a rectangular metal foil except for peripheral portions of the long sides.

In these conventional methods, however, it is the current situation that the production of foils with a stable aperture ratio at a low cost is not easy, generally due to many steps being required to tend to increase manufacturing costs, burrs being generated during a machining process such as punching to cause difficulty in controlling the nucleation during the anode oxidation, and so on. In addition, a long foil is difficult to produce, and anode oxidation process had problems with the peelability of the porous metal foil and the stability of the aperture ratio, in that continuous peeling of the foil destroys the oxidized film. In particular, porous metal foils with a higher aperture ratio, which do not have burrs and have pores that are smaller in size, are required for anode current collectors of electric storage devices, such as lithium-ion secondary batteries and lithium-ion capacitors as the performance thereof improves.

CITATION LIST

Patent Literature

[Patent Literature 1] JP10-195689A
[Patent Literature 2] JP3262558B
[Patent Literature 3] JP2005-251429A
[Patent Literature 4] JP11-67222A

SUMMARY OF THE INVENTION

The inventors have currently found that implementation of metal plating on a certain type of peelable layer, in which cracks are formed, makes it possible to obtain a porous metal foil having superior properties at a low cost in a highly productive manner that is also suitable for continuous production. Furthermore, the inventors have also found that by bringing a contact member into contact with on a part of the peelable layer in which cracks are formed and sliding the contact member thereon, before the deposition of the metal foil, it is possible to obtain at the contacted portion a reinforced portion which is substantially non-porous or less porous than the porous portion.

Thus, an object of the present invention is to obtain a reinforced porous metal foil having superior properties at a low cost in a highly productive manner that is also suitable for continuous production.

According to an aspect of the present invention, there is provided a reinforced porous metal foil comprising:
 a porous portion comprising a two-dimensional network structure composed of a metal fiber; and
 a reinforced portion which is substantially non-porous or less porous than the porous portion, the reinforced portion being composed of the same metal as the metal fiber and being continuous and integral with the porous portion.

According to another aspect of the present invention, there is provided a method for producing a reinforced porous metal foil, comprising the steps of:
 preparing an electrically conductive substrate comprising a peelable layer, on a surface of which a crack is generated;
 bringing a contact member into contact with a part of the peelable layer and slide the contact member thereon; and
 plating the peelable layer with a metal capable of depositing preferentially on the crack, to grow numerous metal particles along the crack in a region that has not been in contact with the contact member, so that the porous portion is formed, and to grow numerous metal particles so as to be denser than the metal particles in the porous portion in a region that has been in contact with the contact member, so that a reinforced portion is formed.

DETAILED DESCRIPTION OF THE INVENTION

Reinforced Porous Metal Foil

Figure 1:
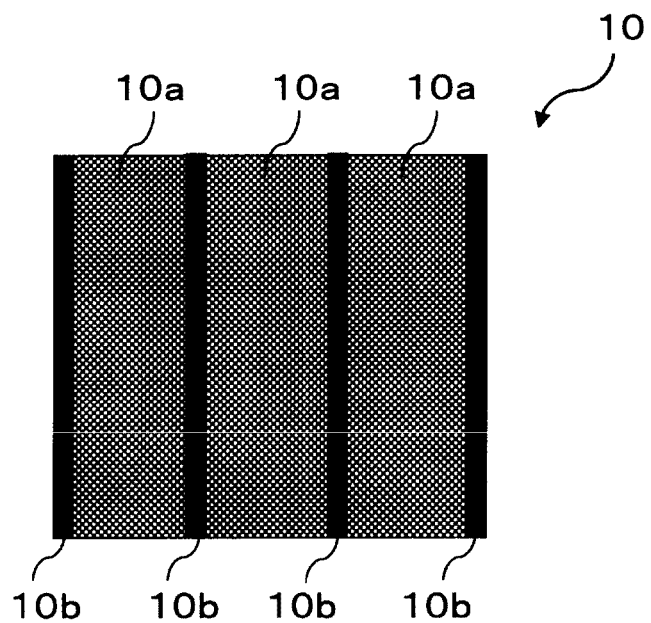
FIG. 1 is a schematic top view of an example of the reinforced porous metal foil according to the present invention.

FIG. 1 shows a schematic view of an example of the reinforced porous metal foil according to the present invention. As shown in FIG. 1, the reinforced porous metal foil 10 according to the present invention comprises a porous portion 10a and a reinforced portion 10b. The porous portion 10a comprises a two-dimensional network structure composed of a metal fiber 11. The reinforced portion 10b is a portion which is substantially non-porous or less porous than the porous portion 10a, being composed of the same metal as the metal fiber 11 and being continuous and integral with the porous portion 10a.

Figure 2:
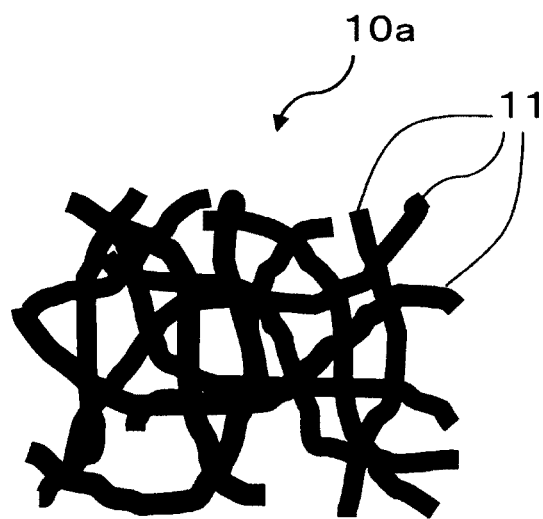
FIG. 2 is a schematic top view of an example of the porous portion of the reinforced porous metal foil shown in FIG. 1.

The porous portion 10a comprises a two-dimensional network structure composed of the metal fiber 11. FIG. 2 shows a schematic top view of an example of the porous portion 10a. As shown in FIG. 2, the porous portion 10a comprises a two-dimensional network structure composed of the metal fiber 11. The porous portion 10a has an aperture ratio of preferably 3 to 80%, more preferably 5 to 60%, further preferably 10 to 55%, and still further preferably 20 to 55%. The aperture ratio P (%) is defined herein as:

$$P = 100 - [(W_p/W_n) \times 100]$$

wherein $W_p/W_n$ is the ratio of the weight $W_p$ of a porous metal foil to the theoretical weight $W_n$ of a non-porous metal foil having a composition and a size which are identical to those of the porous metal foil. This theoretical weight $W_n$ may be calculated by: measuring the size of the porous metal foil obtained; calculating the volume (i.e., the theoretical volume of the non-porous metal foil) from the measured size; and then multiplying the resultant volume by the density of the material of the porous metal foil prepared.

In this way, in the porous portion 10a, it is possible to secure a sufficient strength based on the numerous metal fibers 11 which are networked in a two-dimensional manner, even if the aperture ratio is set higher. Therefore, it is possible to raise the aperture ratio to a level that has never been achieved, without concern for strength decrease. For example, the porous portion 10a may have a tensile strength of preferably not less than 10N/10 mm, more preferably not less than 15N/10 mm, as measured according to the later-described measuring method, thus making it possible to effectively prevent the porous metal foil from breaking. However, in the case where the porous metal foil is handled with a carrier attached to the foil, a tensile strength lower than the above ranges are of no problem. In this case, it is possible to maximize the aperture ratio without concern for tensile strength.

The porous metal foil 10 has a thickness of preferably 3 to 40 µm, more preferably 3 to 30 µm, further preferably 5 to 25 µm, still further preferably 10 to 20 µm, most preferably 10 to 15 µm. Within these ranges, a superior balance is achieved between high aperture ratio and high strength. The thickness of the porous metal foil corresponds to the maximum cross-sectional height of the metal fiber, since the porous metal foil of the present invention comprises the two-dimensional network structure composed of the metal fiber. The thickness is preferred to be measured by a commercially available film-thickness measuring device having a spindle which is larger than the pore sizes of the porous metal foil.

The metal fiber 11 is a fiber made of metal, and the metal to be used may be suitably chosen depending on the intended use and is not particularly limited. Preferred metal comprises at least one selected from the group consisting of copper, aluminum, gold, silver, nickel, cobalt, and tin. The term "comprise" means that it embraces metal or alloy mainly containing metal element(s) as listed above, which may include other metal element(s) and unavoidable impurities as the balance, and preferably means that metal element(s) as listed above constitutes not less than 50% by weight of the metal or alloy, with a typical example being metal or alloy consisting of metal element(s) as listed above and unavoidable impurities. The above definition will be equally applied to similar expressions described hereinbelow with regard to metal. Among these metals, metal or alloy suitable for anode current collectors of electric storage devices, such as lithium-ion secondary batteries and lithium-ion capacitors, includes metal or alloy comprising at least one selected from the group consisting of copper, copper alloys, nickel, cobalt, and tin, preferably copper. In particular, the two-dimensional network structure is preferred to have an irregular shape derived from a crack, which has been formed on the surface of a substrate.

The fiber diameter of the metal fiber 11 is preferred to be 5 to 80 µm, more preferably 5 to 50 µm, further preferably 8 to 30 µm, most preferably 10 to 20 µm. The term "fiber diameter" is defined as the width (thickness) of the fiber 11 when the porous metal foil is viewed from straight above, and can be measured by using optical microscope, field emission scanning electron microscope (FE-SEM), scanning ion microscope (SIM) or the like. Within these ranges, a superior balance is achieved between high aperture ratio and high strength.

Figure 3:
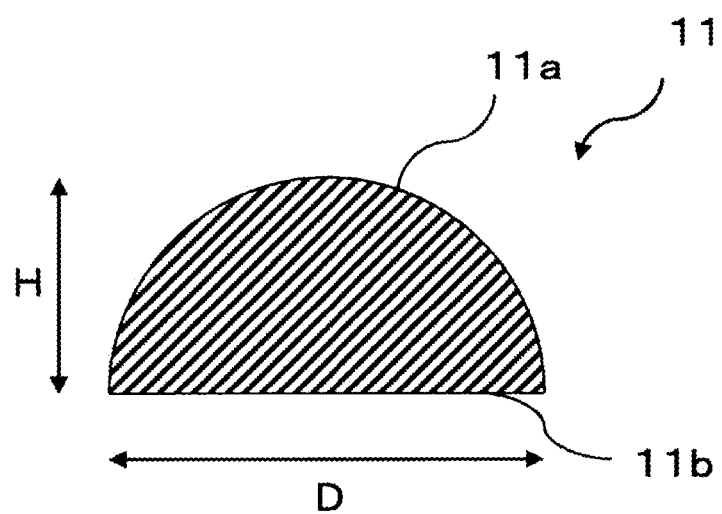
FIG. 3 is a schematic cross-sectional view of the metal fiber composing the porous portion shown in FIG. 2.

According to a preferred embodiment of the present invention, as shown in FIG. 2, the metal fiber 11 is a branched fiber, which is irregularly networked to constitute the porous portion 10a. The fiber 11 is formed by numerous metal particles being connected to each other, resulting from nucleation along the later-mentioned crack in the peelable layer. Since it is desirable for the adjacent metal particles to tightly connect with each other through particle growth in order to constitute the metal fiber, the metal particles constituting the metal fiber may no longer have the complete shapes of the particles. In addition, as shown in FIG. 3, the metal particles constituting the metal fiber 11 typically have hemispherical shapes having spherical parts 11a and bottom parts 11b. The bottom parts 11b of all the metal particles are positioned on the same basal plane, while the spherical parts 11a of all the metal particles are positioned to the same side with reference to the basal plane. In this case, the width D of the bottom part 11b along the basal plane is the fiber diameter, while the maximum cross-sectional height H of the spherical part 11a corresponds to the thickness of the porous metal foil. This basal plane and the bottom part 11b positioned thereon have a shape corresponding to the flat plane shape of the peelable layer which is used during the production, although they are not limited to this shape when the foil is produced by other production methods. According to the inventors' experience, the average ratio of the maximum cross-sectional height H to the fiber diameter D of the fiber 11 is, but not limited to, typically 0.30 to 0.70, more typically 0.40 to 0.60, further typically 0.45 to 0.55, most typically about 0.50, and may be adjusted by modifying the plating conditions or the like as appropriate. In addition, according to the inventors' experience, the average area of the pores in the porous portion 10a is, but not limited to, typically 3 to 5000 µm², more typically 3 to 3000 µm², further typically 3 to 2000 µm². Furthermore, according to the inventors' experience, in the porous portion 10a, the ratio of the number of pores having areas of not more than one-half of the largest pore area to the number of the total pores is, but not limited to, typically not less than 60%, more typically not less than 70%, further typically not less than 80%.

The reinforced portion 10b is a portion which is substantially non-porous or less porous than the porous portion 10a, being composed of the same metal as the metal fiber 11 and being continuous and integral with the porous portion 10a. Specifically, the reinforced portion 10b is integrally formed with the porous portion 10a using the same material, and has a shape that is continuous with the porous portion 10a. This means that the reinforced porous metal foil according to the present invention does not include a composite comprising the porous portion 10a and the reinforced portion 10b that were separately formed and combined later. Therefore, the porous portion 10a and the reinforced portion 10b should be distinguished from each other in terms of the number of pores or the existence/absence of the pores, and should not be distinguished in terms of the constituent material or shape except for pore (for example, thickness). Therefore, the porous portion 10a typically has a thickness equivalent or close to that of the reinforced portion 10b. As needed, the thickness can be adjusted by controlling such conditions as current density, plating solution, plating solution flow rate, masking, etc. The existence of such a reinforced portion 10b makes the porous metal foil less likely to break, and thus can facilitate conveyance of the porous metal foil in the production line. Furthermore, in a case where the porous metal foil is used as a current collector in an electricity storage device, it is possible to use the reinforced portion as a tab lead, thus improving the reliability in tab lead connection.

It is preferable that the reinforced portion 10b is provided as at least a part of the outer edge of the metal foil 10. Since breakage such as splitting or tearing is more likely to occur in the outer edge of the porous metal foil than in the outer edge of the non-porous metal foil, composing such a portion as a reinforced portion makes it possible to effectively suppress the breakage of outer edge, thereby facilitating the production of a thin porous metal foil. For example, if the metal foil 10 has an elongated shape, it is preferable that the outer edges along the longitudinal direction of the metal foil 10 be composed of the reinforced portion 10b.

The reinforced portion 10b may be provided away from and in parallel with outer edges along a longitudinal direction of the metal foil 10. At some positions away from the outer edges, a metal foil can be slit in the longitudinal direction (and at regular intervals, for example) into a plurality of metal foil long strips. In this case, however, a porous metal foil is more likely to generate fragments such as swarf and machining dust during slitting, as compared to a non-porous metal foil. In this regard, by making the portion to be slit composed of a reinforced portion, it is possible to suppress the occurrence of fragments such as swarf and machining dust during slitting. For example, as in the metal foil 10 shown in FIG. 1, it is preferable that the reinforced portions 10b be provided as outer edges along the longitudinal direction of the metal foil 10, as well as on lines that are away from and in parallel with the outer edges along the longitudinal direction 10 of the metal foil.

The reinforced portions 10b are preferably substantially non-porous from the viewpoint of reinforcement efficiency, ideally non-porous. The term "substantially" herein is intended to allow existence of holes, such as pinholes, which may be inevitably formed during production process. Nevertheless, as far as the reinforced portions can suppress the occurrence of breakage or fragments, it is sufficient if the reinforced portions have holes that are fewer than those of the porous portions. Thus, it is not always necessary that the reinforced portions are non-porous or substantially non-porous.

Production Method

An example of the process for producing the reinforced porous metal foil according to the present invention will be described hereinbelow, while the porous metal foil according to the present invention is not limited to those produced by this production method but includes those produced by other production methods.

Figure 4:
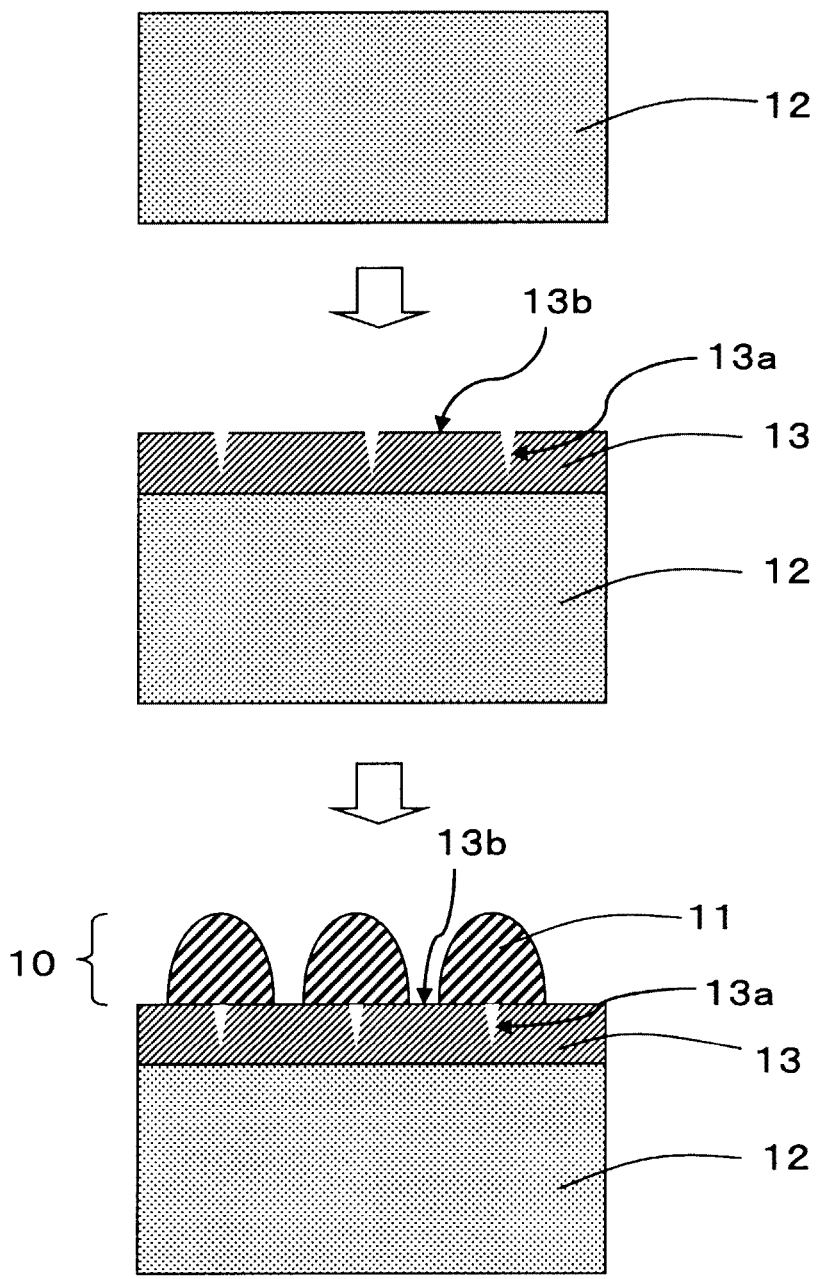
FIG. 4 is a flow diagram showing the flow of the process of producing the reinforced porous metal foil according to the present invention.

FIG. 4 shows the flow of the process of producing the reinforced porous metal foil according to the present invention. In the production method of the present invention, an electrically conductive substrate 12 including a peelable layer 13, on the surface of which cracks are formed, is first provided as a support for producing the porous metal foil. The electrically conductive substrate 12, on which the peelable layer 13 is to be formed, may be a substrate having an electrical conductivity which enables plating thereon. Any of inorganic materials, organic materials, laminates, and materials having metallic surfaces can be used as the substrate, with metals being preferred. Preferred examples of such metals include metals, such as copper, nickel, cobalt, iron, chromium, tin, zinc, indium, silver, gold, aluminum, and titanium, and alloys containing at least one of these metal elements, more preferred examples being copper, copper alloys, nickel, nickel alloys, titanium, titanium alloys, and stainless steels. The configuration of the electrically conductive substrate is also not limited, allowing the use of substrates in various forms including foil, plate, and drum. In the case of drum, an electrically conductive metal plate may be used with the plate being wrapped around the drum. The thickness of the electrically conductive metal plate in this case is preferred to be 1 to 20 mm. The electrically conductive substrate supports the produced porous metal foil during its processing or until just before its use, thus improving the handleability of the porous metal foil. In particular, it is preferable to use a metal foil as the electrically conductive substrate since there are advantages in that the metal foil used as the electrically conductive substrate can be reused as it is after the production of the porous metal foil, or can be recycled through melting and foil production. In this case, the thickness of the metal foil is preferred to be 10 μm to 1 mm as ensuring a strength which prevents wrinkles or twists and the like from generating during the metal foil production process and the subsequent processing-and-transporting process or the like.

The shape of the crack in the peelable layer varies depending on the material and roughness of the electrically conductive substrate, and thus may change the properties of the porous metal foil, such as aperture ratio. On the other hand, it is a matter of course that the shape of the porous metal foil may change even depending on the type or conditions of the metal plating. In order to obtain a desired porous metal foil in consideration of these, selecting the electrically conductive substrate and setting the conditions for forming the peelable layer and/or those for plating may be done suitably depending on the necessity.

The peelable layer 13 is then formed on the electrically conductive substrate 12, with cracks 13a being generated in the peelable layer 13. Prior to the formation of the peelable layer 13, it is preferred to conduct pretreatment, such as acid washing and degreasing, to the electrically conductive substrate 12 to cleanse its surface. The peelable layer 13 is a layer which facilitates the peeling of the porous metal foil 10 to be formed thereon, and is composed of a material which is capable of generating the cracks 13a and has a tendency of being easily plated at the cracks 13a as well as being hardly plated at regions 13b where no cracks exist. That is, a material which allows a certain type of metal to preferentially deposit on the generated cracks 13a by plating is used as the peelable layer 13. In addition, this peelable layer may be formed in a multilayered manner, in which cracks may be formed only in the upper layer or otherwise cracks may be formed not only in the upper layer but also in the lower layer(s). An oxide film may be formed by anode oxidation method, etc. on the surface of the peelable layer, or a diamond-like carbon (DLC) or the like may be present on the surface of the peelable layer. It is preferred to control formation of the cracks 13a so that cracks can spontaneously generate due to the stress in the peelable layer 13. The cracks need not generate at the time of the formation of the peelable layer but may generate during the subsequent steps such as washing-and-drying process or machining process. Although cracks are usually undesirable, the production method of the present invention is characterized by rather taking advantage of the cracks in a positive way. In particular, since cracks usually have characteristics of being formed in a way such that branched lines are networked in a two-dimensional manner, forming metal fiber along the cracks can provide a porous metal foil having a high aperture ratio and a high strength. Since generation of cracks is always of concern in usual film-forming processes, those skilled in the art who engage in film forming is empirically familiar with the conditions for generating cracks, and can easily choose the conditions to the best of their experience and knowledge, for example by adjusting composition control of the plating bath or the like, thickness of the peelable layer, conditions of current density, bath temperature, stirring conditions, or post heating.

The peelable layer 13 comprises at least one selected from the group consisting of chromium, titanium, tantalum, niobium, nickel and tungsten or is composed of an organic material such as a resin. The peelable layer is more preferred to comprise at least one selected from the group consisting of chromium, titanium and nickel which have high hardness, in terms of continuous peelability, durability and corrosion resistance, is further preferred to comprise at least one selected from the group consisting of chromium and titanium, and is most preferred to be composed of chromium, a chromium alloy or a chromium oxide in that it forms passive state, which facilitates the peeling. The thickness of the peelable layer 13 is preferred to be in the range of 1 nm to 100 μm, more preferably 0.1 to 50 μm, further preferably 1 to 30 μm, most preferably 2 to 15 μm. These compositions and thicknesses enable generation of cracks, while providing the peelable layer with a higher resistance relative to the electrically conductive substrate to facilitate the formation and peeling of the porous metal foil 10 which is to be formed on the peelable layer. Therefore, the peelable layer is desired to be composed of a material having a resistance higher than that of the electrically conductive substrate.

The peelable layer 13 can be formed by various film forming methods, which include, but not limited to, electrolytic plating, non-electrolytic plating, sputtering method, physical vapor deposition (PVD), chemical vapor deposition (CVD), sol-gel method, and ion-plating method. In terms of production efficiency or the like, it is preferable that the peelable layer 13 be also formed by electrolytic plating. As necessary, the peelable layer 13 may be further subjected to heat treatment and/or polishing, without departing from the spirit of the invention. Specifically, polishing is permitted to such an extent that the surface of the peelable layer 13 is merely cleansed, but it is a matter of course that polishing should not be conducted so excessively as to disfigure the cracks. Preferably, the peelable layer 13 thus obtained is washed with water or the like and then dried.

In the case of conducting chromium electrolytic plating, preferred chromium plating solutions include Sargent bath and hard chromium plating baths, more preferably hard chromium plating baths. Preferred examples of commercially available hard chromium plating baths include Anchor 1127 produced by Meltex Inc., HEEF-25 produced by Atotech, and Mac-1 produced by Nihon MacDermid Co., Ltd. The bath compositions and electrolytic conditions are shown below, although it is permitted to depart from the following ranges as far as a desired porous metal foil is obtained.

TABLE 1

Preferred Compositions of Chromium Plating Solutions and Electrolytic Conditions

|  | Basic Bath | Commercially Available Hard Chromium Plating Baths | | |
| --- | --- | --- | --- | --- |
|  | Sargent Bath | Anchor 1127 | HEEF-25 | Mac-1 |
| Bath Compositions (g/L) | | | | |
| Chromic Anhydride | 250 | 280-320 | 200-300 | 250-300 |
| Sulfuric Acid | 2.5 | 3.3-3.9 (1.1-1.3 wt %) | 2.0-4.5 | 3.5-4.0 |
| Electrolytic Conditions | | | | |
| Cathode Current Density (A/dm$^2$) | 20-40 | 30-60 | 20-90 | 10-100 |
| Temperature (° C.) | 45-60 | 55-60 | 50-65 | 55-60 |

A stable chromium plating bath typically contains a small amount of trivalent chromium, of which the amount is about 2 to 6 g/L. A catalyst such as an organic sulfonic acid may also be added to the hard chromium plating bath. The concentration of chromic anhydride can be controlled in terms of Baume degree. Furthermore, since impurities, such as iron, copper and chloride ion, affect the plating condition, attention needs to be paid to control the maximum amount of dissolved impurities. An anode used for the chromium plating is preferred to be titanium coated with lead oxide or with a Pb—Sn alloy. Typical examples of such commercially available anodes include Ti—Pb electrode (Sn: 5%) produced by SPF Co., Ltd. and Exceload LD produced by Japan Carlit Co., Ltd.

Before the deposition of the metal foil, a pretreatment is performed by bringing a contact member into contact with a part of the peelable layer 13, in which cracks are formed, and sliding the contact member thereon. This pretreatment makes it possible to obtain a reinforced portion, which is less porous or substantially non-porous than the porous portion, at the contacted portion in the subsequent plating process. In other words, by performing a pretreatment on a part on which a reinforced portion is to be formed, it is possible to easily form a reinforced portion in a desired part of the porous metal foil. Regarding the phenomenon that a less porous metal foil forms on a portion contacted by the contact member, there are various conceivable factors, among which one factor is considered to be that as the passive state film becomes thinner, the water contact angle at the contacted portion becomes smaller to increase the wettability of the plating in the subsequent plating process so that a plating is formed over the entire surface regardless of the shapes of the cracks. However, since other factors can also be considered as possibilities, the present invention should not be bound by this theory.

As the contact member to be used in the pretreatment, various members that can be in contact with the peelable layer can be used unless such members provide the peelable layer with an undesired defacement. Nevertheless, in order to apply the contact member to continuous production using a rotating drum etc., abrasion of the peelable layer caused by the contact with the contact member is desired to be small. For this reason, the contact member is preferably a member that has no or very poor polishability such as a general water-absorbing material, or a member that has low polishability such as fine grit waterproof abrasive paper, more preferably, a member that has no or very poor polishability such as a general water-absorbing material. It is particularly preferable that the contact member contain water or an aqueous liquid. The water-absorbing materials may include various known materials that can contain water or aqueous liquid. Examples of the water-absorbing material include sponge, buff, sponge buff, cleaning buff, fabric, woven fabric, nonwoven fabric, waste cloth, absorbent cotton, and the combinations thereof, preferably cleaning buff. The liquid that may be contained in the water-absorbing material may be water or an aqueous liquid such as an aqueous solution in which some component is dissolved or dispersed in water within a range that does not depart from the spirit of the present invention. It is preferable that the aqueous solution contain no abrasive. The amount of the water or aqueous liquid contained in the water-absorbing material is not limited. As far as a desired effect can be obtained, the water-absorbing material may not contain water or an aqueous liquid.

The peelable layer 13 thus pretreated is then plated with a metal capable of depositing preferentially on the cracks 13a to grow numerous metal particles along the cracks 13a in a region that has not been in contact with the contact member (hereinafter referred to as the "noncontact region"), thereby forming a porous portion 10a, as well as to grow numerous metal particles in a region that has been in contact with the contact member (hereinafter referred to as the "contact region") so as to be denser than those in the porous portion, thereby forming a reinforced portion 10b. As described above, the noncontact region of the peelable layer 13 has the cracks 13a having a tendency of being easily plated thereon and the crack-free regions 13b having a tendency of being hardly plated thereon. The reason why the cracks 13a tend to be easily plated is that current flows more easily in parts where the cracks 13a exist than in regions 13b where no such cracks exist, resulting in preferential occurrence of nucleation and its growth on the cracks 13a. The metal capable of depositing preferentially on the cracks 13a preferably comprises at least one element selected from the group consisting of copper, aluminum, gold, silver, nickel, cobalt, and tin, more preferably at least one element selected from the group consisting of copper, gold, silver, nickel, cobalt, and tin, further preferably at least one element selected from the group consisting of copper, silver, and gold, most preferably, copper.

The porous metal foil can be formed by plating methods with no particular limitation, which include electrolytic plating and non-electrolytic plating, between which electrolytic plating is preferable since it enables metal to deposit on the cracks 13$a$ efficiently. The plating conditions may be determined in accordance with known methods and are not particularly limited. For example, copper plating is preferred to be conducted in a copper sulfate plating bath. In the copper plating, preferred plating bath compositions and electrodepositing conditions include, but not limited to, copper sulfate pentahydrate in a concentration of 120 to 350 g/L; sulfuric acid in a concentration of 50 to 200 g/L; a cathode current density of 10 to 80 A/dm$^2$; and a bath temperature of 40 to 60° C.

An additive agent may be suitably added to the plating solution to enhance properties of the metal foil. In the case of copper foil, for example, preferred examples of such additive agents include hide glues, gelatins, chlorine, sulfur-containing compounds such as thiourea, synthesized additive agents such as polyethylene glycols. With these preferred additive agents, it is possible to control dynamic properties and surface condition of the metal foil. The concentration of the additive agent is not limited but is normally in the range of 1 to 300 ppm.

Finally, the reinforced porous metal foil is peeled off from the electrically conductive substrate having the peelable layer to obtain an independent reinforced porous metal foil. The peeled foil may be transferred to another substrate such as a film provided with an adhesive layer thereon, or may be subjected to a surface treatment such as an anti-corrosive treatment. This peeling step, however, is not essential, and the foil may be composed so that it can be handled as a porous metal foil product which remains provided with the substrate via the peelable layer and may not be peeled off until just before use. In this case, the porous metal foil can be more easily handled, while it becomes possible to significantly increase the aperture ratio or significantly reduce the film thickness because high strength is not so required due to the support by the substrate.

Since the cracks still remain on the surface of the peelable layer, it is possible to reuse the peelable layer by subjecting it again to the contacting step with a contact member. However, increasing repetition of such reuse may lead to a decrease in the crack selectivity of the plating in the non-contact region, and thus may make it less likely to obtain a desired porous portion. In view of this, it is preferable to perform a step of drying the peelable layer to recover or maintain the crack selectivity of the plating. That is, after the peeling step, the peelable layer, on which cracks have been made, remains on the surface of the electrically conductive substrate, and such an electrically conductive substrate provided with the peelable layer can be reused for a series of steps including the contact step, the plating step, and the peeling step. The decrease of the crack selectivity of the plating caused by the reuse can be prevented by the drying step. The conditions of the drying step are not particularly limited, but it is preferable that the drying step be performed at a temperature of 25 to 250° C. The peelable layer may be dried naturally.

Figure 5:
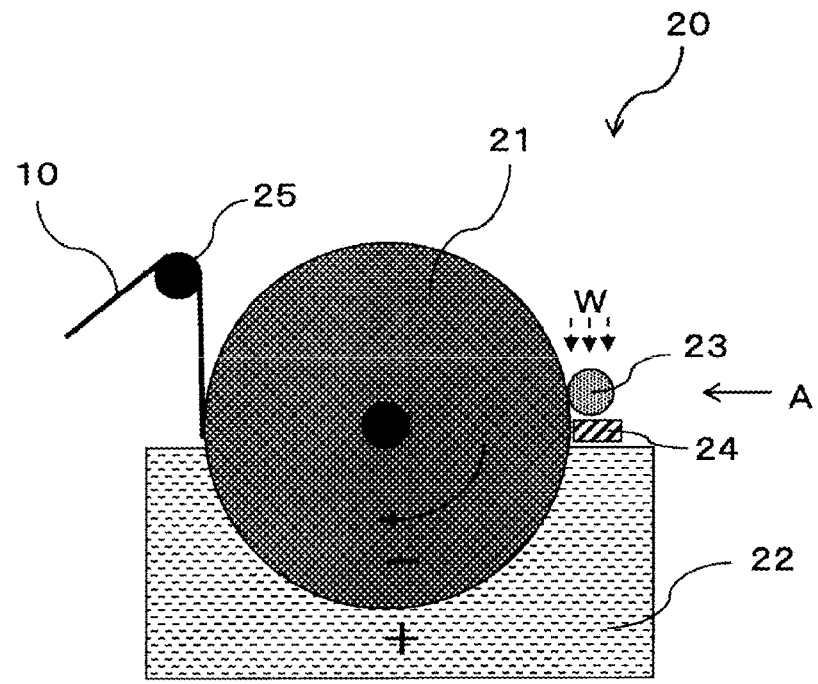
FIG. 5 is a schematic cross-sectional view showing an example of a rotating drum type foil production apparatus for producing the reinforced porous metal foil according to the present invention.
Figure 6:
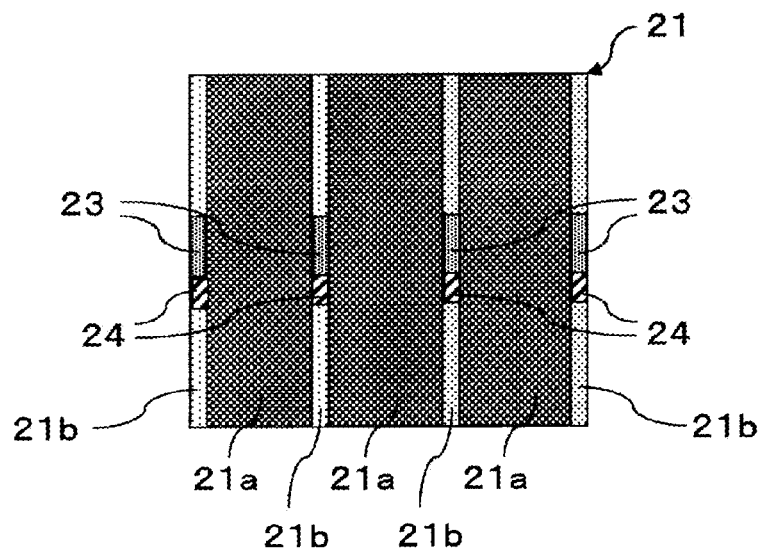
FIG. 6 is a front view for schematically showing the rotating drum viewed from the water-absorbing material side in the direction of the arrow A in FIG. 5.
Figure 7:
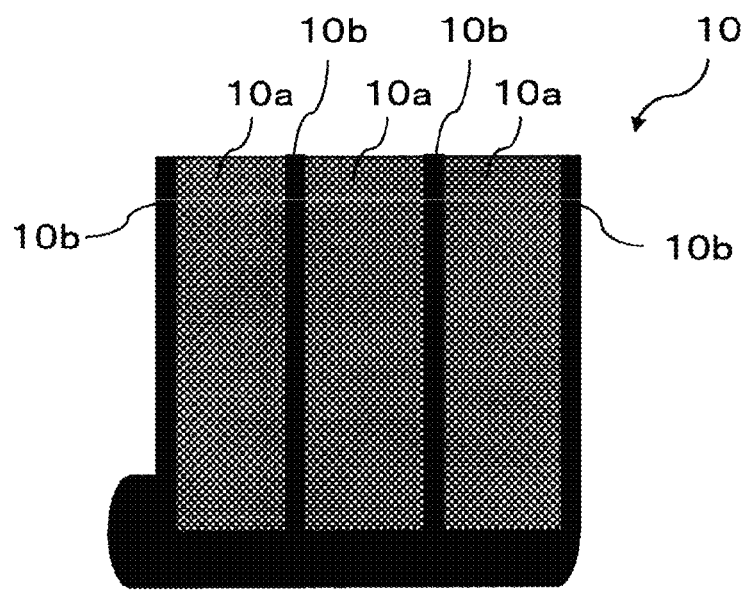
FIG. 7 is a perspective view schematically showing the reinforced porous metal foil roll according to the present invention, which is produced by using the rotating drum shown in FIG. 6.

According to a preferred embodiment of the present invention, an electrically conductive substrate provided with a peelable layer may be configured in the form of a rotating drum, while the contact step, the plating step, the peeling step, and the drying step may be sequentially repeated by the rotation of the electrically conductive substrate. FIG. 5 shows a perspective sectional view of such a rotating drum type foil production apparatus. The foil production apparatus 20 shown in FIG. 5 includes a rotating drum 21 (for example, a stainless steel drum) formed of an electrically conductive substrate provided with a peelable layer (for example, a chromium plating layer) in the surface of which cracks are formed; an electroplating bath 22 in which a lower part of the rotating drum 21 is immersed in a plating solution; a water-absorbing material 23 positioned so that it can be in contact with a part of the peelable layer on the rotating drum; a water receptor 24 for receiving water dripping from the water-absorbing material; and a peeling roll 25 for peeling off the porous metal foil 10 from the rotating drum and conveying the porous metal foil 10. FIG. 6 is a front view schematically showing the rotating drum 21 viewed from the water-absorbing material 23 in FIG. 5 in the direction of the arrow A. As shown in FIG. 6, a plurality of water-absorbing materials 23 and water receptors 24 therefor may be disposed at regular intervals in the direction of the rotating axis of the rotating drum 21. The foil production apparatus 20 may also include water supplying means for supplying water W to the water-absorbing material 23, or may be configured to use a water-absorbing material that is soaked with water in advance. When the rotating drum 21 in the foil production apparatus 20 is rotated, as shown in FIGS. 6 and 7, the water-absorbing material 23 becomes in contact with the surface of the rotating drum 21 (i.e., the peelable layer) and slides relative thereto to form an elongated region 21$b$ which has contacted by the water-absorbing material 23, so that a foil portion prepared in contact with the region 21$b$ forms a reinforced portion 10$b$. On the other hand, a foil portion prepared in contact with the region 21$a$, which has not been contacted by the water-absorbing material 23 forms a porous portion 10$a$. After the peeling step, the rotating drum is washed with water if desired, and is subjected to the drying step. Although the foil production apparatus 20 is configured to perform the drying step naturally, heating means may be provided thereto to perform the drying step artificially. At any rate, the rotating drum which underwent the drying step is rotated to be subjected to the contact step again, followed by the plating step, the peeling step, and the drying step. According to such an embodiment, it is possible to mass-produce a reinforced porous metal foil in a rolled form very effectively by using a rotating drum type foil production apparatus.

Applications

Typical applications of the porous metal foil according to the present invention include anode current collectors of electric storage devices, such as lithium-ion secondary batteries and lithium-ion capacitors. Alternatively, the porous metal foil can be used in various applications, such as screening devices for fine-powder classification or solid-liquid separation, catalyst carriers, nets to be used in oxygen inlets of microorganism storage containers, dust-proof filters for clean rooms, antibacterial filters for liquids, filters for liquid reforming, electromagnetic-wave shields, magnetic materials, electrically conductive materials, and decoration sheets. For example, when the porous metal foil is used as an inner layer of a printed board to work as an electrically conductive material or the like, it is possible, through the pores, to release a gas derived from a resin, a solvent or the like, so that generation of blisters can be prevented. In addition, using the porous metal foil for forming circuits as an electrically conductive material or the like can attain weight reduction of the circuits by reducing the metal usage.

EXAMPLES

The present invention will be explained in more detail below with reference to Examples.

Example A1

Preparation of Reinforced Porous Metal Foil

A stainless steel plate (SUS316) having a thickness of 1 mm was prepared as an electrically conductive substrate. A chromium plating for forming a peelable layer was performed on the stainless steel plate in the following manner. At the outset, as the pretreatment, the surface of the electrode was cleaned by alkaline electrolytic degreasing using Endox 114 (an alkaline deruster produced by Meltex Inc.) under the conditions of a current density of 10 A/dm$^2$, an electrolysis time of 10 minutes, and an anode being DSE (Dimensionally Stable Electrode). After washed with water, the degreased stainless steel plate was immersed in 50 ml/L sulfuric acid for 1 minute to be acid-activated. After washed with water, the acid-activated stainless steel plate was immersed in a chromium plating bath (HEEF 25 produced by Atotech) in which 250 g/L chromic anhydride, 3 g/L sulfuric acid, and 22 m/L HEEF 25C (produced by Atotech) were dissolved, and was subjected to a chromium plating under the conditions of a temperature of 55° C., a current density of 30 A/dm$^2$, and an electrolysis time of 17 minutes. At this time, a Ti—Pb electrode (Pb—Sn 5%, produced by SPF Co., Ltd.) was used as the anode. The stainless steel plate on which the chromium plating was formed was washed with water and then dried. Numerous cracks, which are considered to have been formed by plating stress, were confirmed on the surface of the chromium plating obtained.

A cleaning buff soaked with water (produced by Tsunoda Brush Co., Ltd. with the product name of "NA Cleaning Buff," non-abrasive buff with polypropylene nonwoven material) was brought into contact with a part of the chromium plating in which the cracks were formed, and lightly slid thereon. The water contact angle on the surface of the chromium plating thus having been pretreated was measured. As a result, the water contact angle of the portion which has contacted the cleaning buff (hereinafter referred to as the "contact region") was 25.8 degrees, while the water contact angle of the portion which has not contacted the cleaning buff (hereinafter referred to as the "noncontact region") was 69.3 degrees. From this, it was confirmed that the portion which has contacted the cleaning buff was hydrophilized. Incidentally, the water contact angle is defined as an angle θ between the tangent of a water drop on a surface of a solid body and the surface of the solid body, and was evaluated by measuring the water contact angle after 10 seconds from the drop by using a contact angle measurement device (Kyowa Interface Science Co., Ltd., "Contact Angle Meter").

Figure 8:
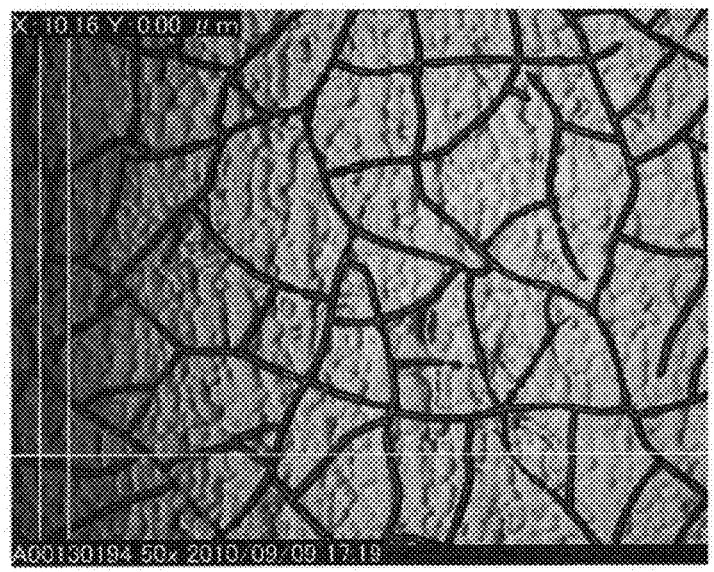
FIG. 8 is an image obtained in Example A1 by observing the surface of the noncontact region, which is to be the porous portion, immediately after the beginning of the copper plating, under an optical microscope (at a magnification of 500 times) from straight above (at a tilt angle of 0°).
Figure 9:
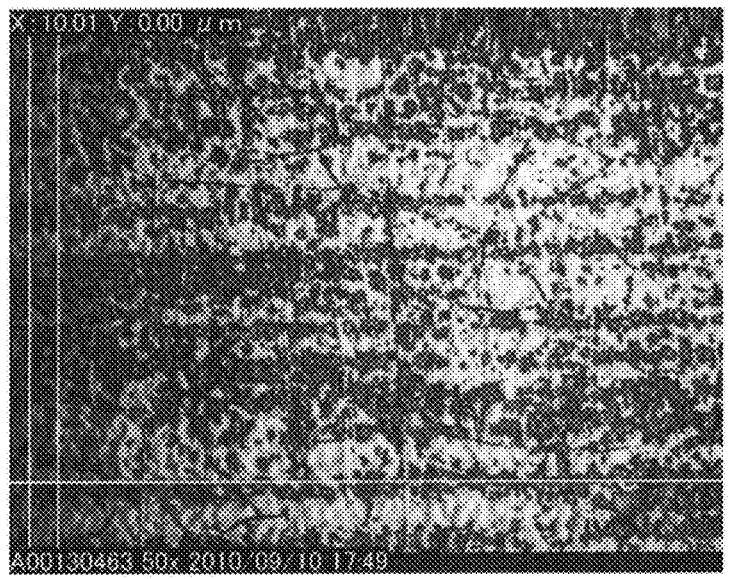
FIG. 9 is an image obtained in Example A1 by observing the surface of the contact region, which is to be the reinforced portion, immediately after the beginning of the copper plating, under the optical microscope (at a magnification of 500 times) from straight above (at a tilt angle of 0°).

A copper sulfate plating was performed on the locally pretreated chromium plating in which the cracks were generated. In the copper sulfate plating, the stainless steel plate, on which the chromium plating had been performed, was immersed in a copper sulfate plating bath in which 250 g/L copper sulfate pentahydrate (having a copper concentration of about 64 g/L) and 80 g/L sulfuric acid were dissolved, and was plated under the conditions including a current density of 20 A/dm$^2$, a plating time of 150 seconds, an anode being DSE (Dimensionally Stable Electrode), and a bath temperature of 40° C. The noncontact region and the contact region immediately after the beginning of the copper plating were observed by an optical microscope (at the magnification of 500 times) to obtain images shown FIGS. 8 and 9, respectively. As can be seen from FIG. 8, in the noncontact region, since current flows more easily through the crack part than the outermost surface of the chromium plating, copper particles originating from the cracks have grown. On the other hand, as can be seen from FIG. 9, in the contact region, copper particles deposited over the entire surface, instead of depositing selectively in the cracked portions. As a result, there was formed a metal foil comprising a porous portion which comprises a two-dimensional network structure composed of copper fibers formed on the chromium plating derived from the noncontact region; and a nonporous reinforced portion derived from the contact region. Finally, the porous metal foil was physically peeled off from the chromium plating to obtain a reinforced porous metal foil. The thickness of the copper foil obtained was 15 μm, and the weight aperture ratio was 34%.

Example A2

Observation on Reinforced Porous Metal Foil

Figure 10:
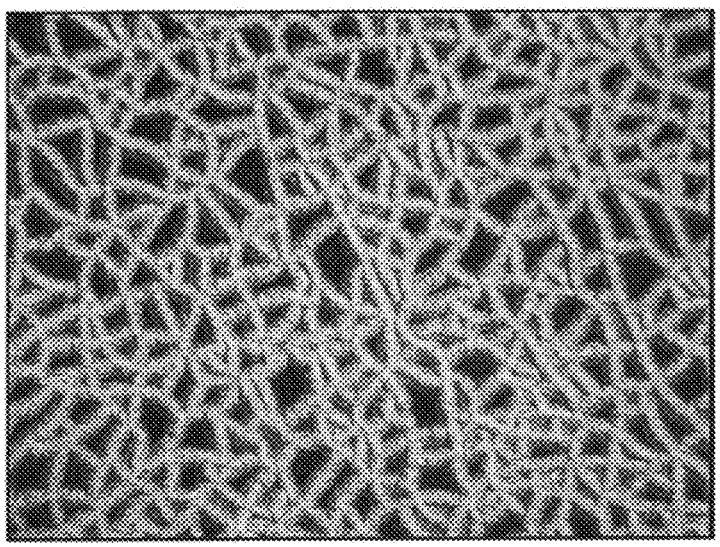
FIG. 10 is an image obtained in Example A2 by observing the surface which did not contact the peelable layer of the porous portion of the reinforced porous metal foil according to the present invention, under the optical microscope (at a magnification of 500 times) from straight above (at a tilt angle of 0°).
Figure 11:
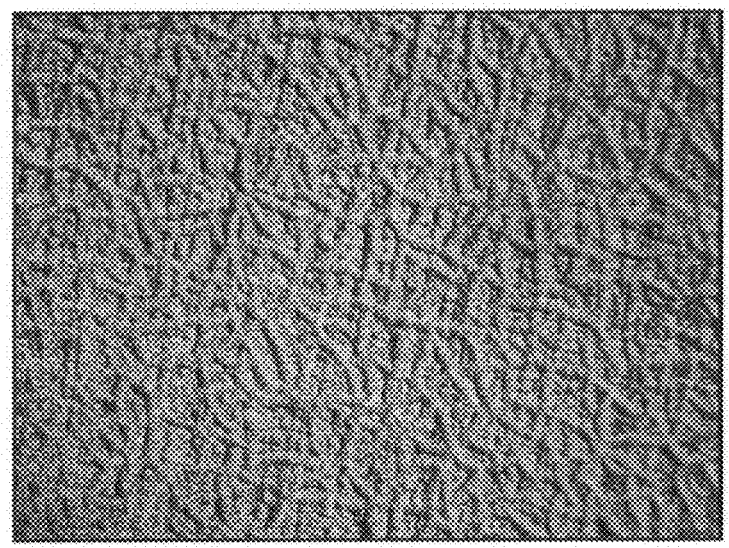
FIG. 11 is an image obtained in Example A2 by observing the surface which did not contact the peelable layer of the reinforcing region of the reinforced porous metal foil according to the present invention, under the optical microscope (at a magnification of 500 times) from straight above (at a tilt angle of 0°).

The reinforced porous metal foil obtained in Example A1 was observed by an optical microscope (at a magnification of 500 times). At the outset, the side of the porous portion of the porous metal foil, which had not been in contact with the peelable layer (hereinafter referred to as the "growth side") was observed from straight above (at a tilt angle of 0°) to obtain the image shown in FIG. 10. Then, the side of the reinforced portion of the porous metal foil, which had not been in contact with the peelable layer (hereinafter referred to as the "growth side") was observed from straight above (at a tilt angle of 0°) to obtain the image shown in FIG. 11. As is clear from these drawings, a two-dimensional network structure composed of metal fibers was observed in the porous portion, while a nonporous metal foil part was confirmed as the reinforced portion, in which no pore was observed.

Example B1

Preparation of Porous Metal Foil (Porous Portion)

Copper foil having a thickness of 35 μm was prepared as an electrically conductive substrate. A chromium plating for forming a peelable layer was performed on the copper foil in the following manner. At the outset, the copper foil was immersed for 2 minutes at 40° C. in an acidic cleaner for printed-wiring board (PAC-200 produced by Murata Co., Ltd.) of which the concentration was adjusted to 120 ml/L with added water. The copper foil thus cleansed was immersed in 50 ml/L sulfuric acid at room temperature for 1 minute to be acid-activated. The acid-activated copper foil was immersed in a chromium plating bath in which 180 g/L Econo-Chrome 300 (produced by Meltex Inc.) and 1 g/L pure concentrated sulfuric acid were dissolved, and was subjected to a chromium plating for 15 minutes under the conditions of a temperature of 45° C. and a current density of 20 A/dm$^2$. The copper foil on which the chromium plating was formed was washed with water and then dried. The thickness of the resultant chromium plating was about 2 μm as measured by XRF (X-ray fluorescence analysis). Numerous cracks, which would have been formed by plating stress, were confirmed on the surface of the chromium plating.

A copper sulfate plating was performed on the chromium plating where the cracks generated. In this copper sulfate plating, the chromium-plated copper foil was immersed in a copper sulfate plating bath in which 250 g/L copper sulfate pentahydrate (having a copper concentration of about 64 g/L) and 80 g/L sulfuric acid were dissolved, and plated under the conditions including a current density of 20 A/dm$^2$; a plating time of 150 seconds; an anode being DSE (Dimensionally Stable Electrode); and a bath temperature of 40° C. During the plating, since current flows more easily on the crack part than on the outermost surface of the chromium plating, copper particles originating from the cracks have grown. As a result, a two-dimensional network structure composed of copper fibers was formed, as a porous metal foil, on the chromium plating. Finally, the porous metal foil was physically peeled off from the chromium plating to obtain an isolated porous metal foil (porous portion).

Example B2

Observation on Porous Metal Foil (Porous Portion)

Figure 12:
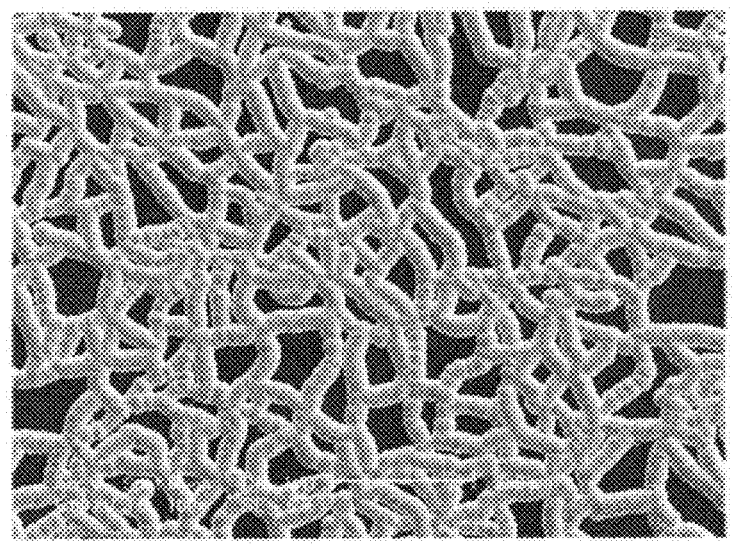
FIG. 12 is an FE-SEM image obtained in Example B2 by observing the surface which did not contact the peelable layer of the porous metal foil (porous portion) from straight above (at a tilt angle of 0°).
Figure 13:
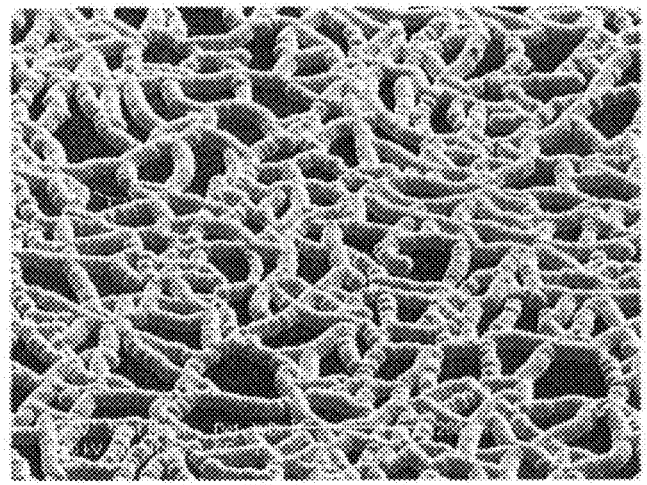
FIG. 13 is an FE-SEM image obtained in Example B2 by observing the surface which did not contact the peelable layer of the porous metal foil (porous portion) from obliquely above (at a tilt angle of 45°).
Figure 14:
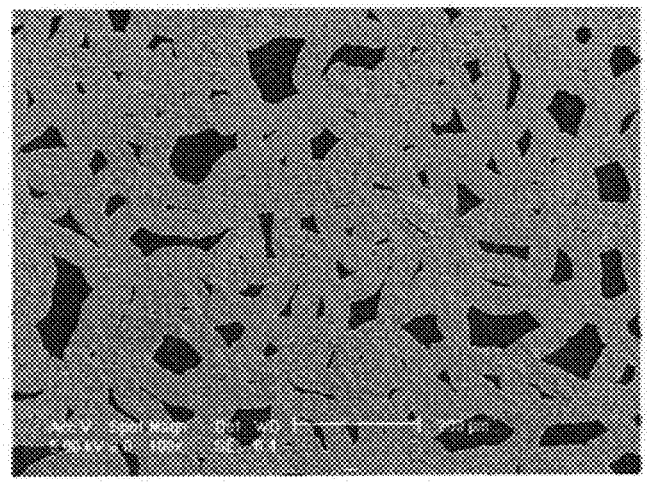
FIG. 14 is an FE-SEM image obtained in Example B2 by observing the surface which contacted the peelable layer of the porous metal foil (porous portion) from straight above (at a tilt angle of 0°).
Figure 15:
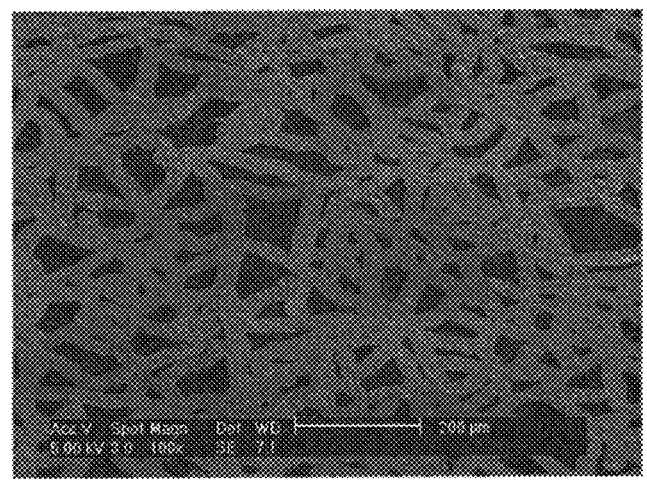
FIG. 15 is an FE-SEM image obtained in Example B2 by observing the surface which contacted the peelable layer of the porous metal foil (porous portion) from obliquely above (at a tilt angle of 45°).

The porous metal foil obtained in Example B1 was observed by a field emission-scanning electron microscope (FE-SEM) from different angles. At the outset, the side which had not been in contact with the peelable layer of the porous metal foil (hereinafter, growth side) was observed from straight above (at a tilt angle of 0°) and obliquely above (at a tilt angle of 45°) to obtain images shown in FIGS. 12 and 13, respectively. After the porous metal foil was turned back, the other side which had been in contact with the peelable layer of the porous metal foil (hereinafter, peelable side) was also observed from straight above (at a tilt angle of 0°) and obliquely above (at a tilt angle of 45°) to obtain images shown in FIGS. 14 and 15, respectively. As is clear from these figures, beaded irregularities derived from the spherical parts of the metal particles were observed on the growth side, while a plane derived from the bottom part of the metal particles and center lines formed along the cracks were observed on the peelable side.

Figure 16:
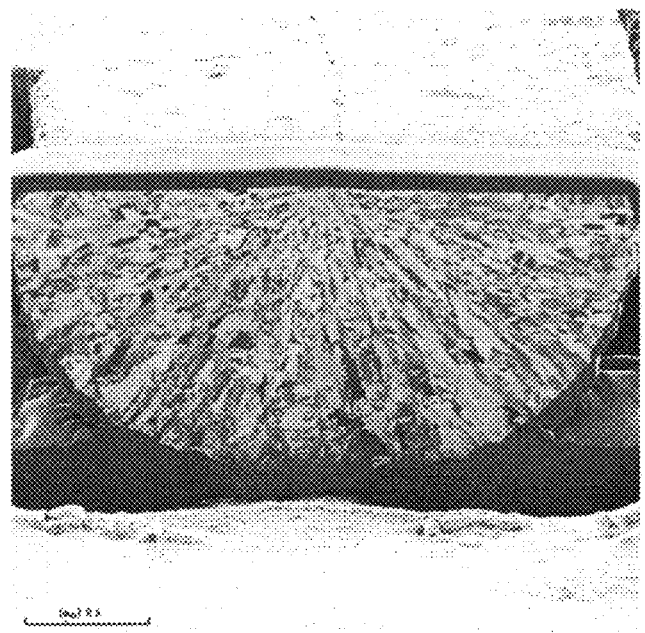
FIG. 16 is a SIM image obtained in Example B2 by observing the cross-sectional surface formed by vertically cutting the metal fiber composing the porous metal foil (porous portion), at a tilt angle of 60°.

Furthermore, a cross-sectional surface of the metal fiber of the porous metal foil was observed by a scanning ion microscope (SIM) to obtain an image shown in FIG. 16, after having been processed by a focused ion beam processing apparatus (FIB). As shown in this figure, it was observed that the cross-sectional structure of the metal fiber had been created by deposition occurred radially from the crack as a starting point, and that the cross-sectional shape of the metal fiber was in the form of a semilunar including a spherical part and a flat bottom. The fiber diameter (thickness) of the metal fiber was 30 μm as calculated by using the scales shown in these figures. The ratio of the maximum cross-sectional height H to the fiber diameter D at the cross-sectional surface of the metal fiber was calculated to be about 0.50. The number of pores per unit area was about 300 mm$^{-2}$. The largest pore area observed was about 4700 μm$^2$, while the ratio of the number of pores having pore areas not more than one-half of the largest pore area (i.e., not more than about 2350 μm$^2$) to the number of the total pores was about 90%.

Example B3

Measurement of Aperture Ratio

The aperture ratio of the porous metal foil obtained in Example B1 was determined by weight method in the following manner. At the outset, the thickness of the porous metal foil was measured to be 14.7 μm by a digital length measuring system (Digimicro MH-15M manufactured by Nikon Corporation). In this measurement, MS-5C (manufactured by Nikon Corporation) was used as a measuring stand, while a spindle which is the standard equipment of Digimicro MH-15M was used. The unit weight per 100 mm×100 mm square of the foil was measured to be 0.94 g. On the other hand, the theoretical weight of a non-porous copper foil having a thickness of 14.7 μm and an area of 100 mm×100 mm square was calculated to be 1.31 g, using the copper density of 8.92 g/cm$^3$. With these values, the aperture ratio of the porous metal foil was calculated to be 28% as shown below.

$$\text{(Aperture ratio)} = 100 - [\text{(Unit weight of the sample)}/\text{(Theoretical weight of the non-porous copper foil)}] \times 100 =$$
$$100 - [(0.94)/(1.31)] \times 100 = 28\%$$

Example B4

Measurement of Tensile Strength

Figure 17:
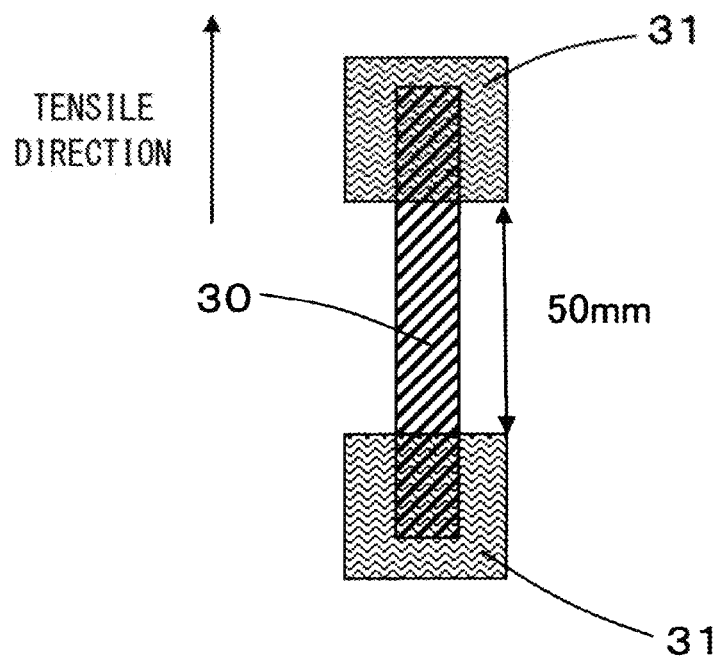
FIG. 17 is a schematic view showing the fixation of a metal foil (porous portion) sample to fixtures in the tensile strength test conducted in Example B4.

The tensile strength of the porous metal foil obtained in Example B1 was measured in accordance with JIS C 6511-1992 as shown below. At the outset, a test piece having a size of 10 mm×100 mm was cut off from the porous metal foil. As shown in FIG. 17, this test piece 30 was fixed with its both ends being held by an upper fixture 31 and a lower fixture 31 of a tensile strength tester (Autograph manufactured by Shimadzu Corporation) so that the distance between the two fixtures could be 50 mm. The tensile strength was then measured by stretching the test piece at a tension rate of 50 mm/minute. In this measurement, a load cell of 1 kN was used in the tensile strength tester. As a result, the tensile strength was 15 N/10 mm width. The percentage of elongation of the test piece during the measurement was 0.8%. From this result, the porous metal foil according to the present invention is considered to have a strength endurable for practical use.

Example C1

Preparation of Porous Metal Foil (Porous Portion)

A stainless steel plate made of SUS304 was prepared as an electrically conductive substrate. A chromium plating for forming a peelable layer with a thickness of 2 μm was performed on the stainless steel plate in the following manner. At the outset, the stainless steel plate was immersed for 2 minutes at 40° C. in an acidic cleaner for printed-wiring board (PAC-200 produced by Murata Co., Ltd.) of which the concentration was adjusted to 120 ml/L with added water. The stainless steel plate thus cleansed was immersed in 50 ml/L sulfuric acid at room temperature for 1 minute to be acid-activated. The acid-activated stainless steel plate was immersed in a commercially available hard chromium plating bath (HEEF-25 produced by Atotech), and was subjected to a chromium plating under the conditions of a cathode current density of 20 A/dm$^2$; an electrolysis time of 400 seconds; a bath temperature of 45° C.; a coulomb amount of 8000 C/dm$^2$; an electrode area of 1.2 dm$^2$; and a distance between electrodes of 90 mm. The stainless steel plate on which the chromium plating was formed was washed with water and then dried. The thickness of the resultant chromium plating was about 2 μm as measured by XRF (X-ray fluorescence analysis). Numerous cracks, which would have been formed by plating stress, were confirmed on the surface of the chromium plating.

A silver plating was performed on the chromium plating where the cracks generated. In this silver plating, the chromium-plated stainless steel plate was immersed in a commercially available silver plating bath (Selenabright C produced by Japan Pure Chemical Co., Ltd.), in which 25 g/L potassium cyanide, silver potassium cyanide (50 g/L as silver), a phosphate and the like were dissolved, and plated under the conditions including a cathode current density of 1.0 A/dm$^2$; an electrolysis time of 469 seconds; and a bath temperature of 40° C. During the plating, since current flows more easily on the crack part than on the outermost surface of the chromium plating, silver particles originating from the cracks have grown. As a result, a two-dimensional network structure composed of silver fibers was formed, as a porous metal foil, on the chromium plating. Finally, the porous metal foil was physically peeled off from the chromium plating to obtain an isolated porous metal foil (porous portion).

Example C2

Observation on Porous Metal Foil (Porous Portion)

Figure 18:
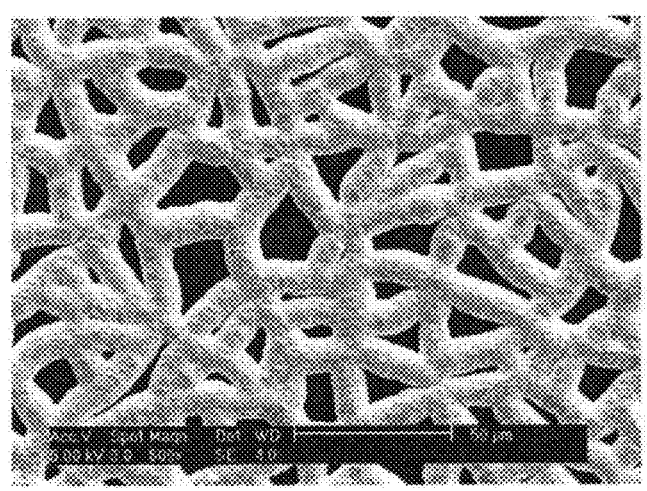
FIG. 18 is an FE-SEM image obtained in Example C2 by observing the surface which did not contact the peelable layer of the porous metal foil (porous portion) from straight above (at a tilt angle of 0°).
Figure 19:
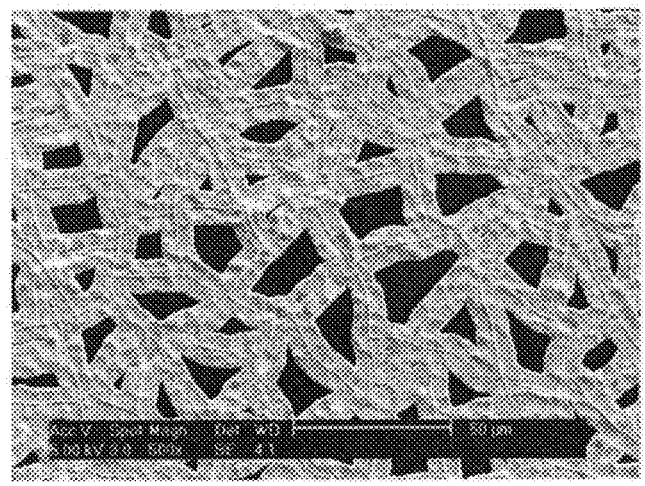
FIG. 19 is an FE-SEM image obtained in Example C2 by observing the surface which contacted the peelable layer of the porous metal foil (porous portion) from straight above (at a tilt angle of 0°).

The porous metal foil obtained in Example C1 was observed by a field emission-scanning electron microscope (FE-SEM) from different angles. At the outset, the side which had not been in contact with the peelable layer of the porous metal foil (hereinafter, growth side) was observed from straight above (at a tilt angle of 0°) to obtain an image shown in FIG. 18. After the porous metal foil was turned back, the other side which had been in contact with the peelable layer of the porous metal foil (hereinafter, peelable side) was also observed from straight above (at a tilt angle of 0°) to obtain an image shown in FIG. 19. As is clear from these figures, beaded irregularities derived from the spherical parts of the metal particles were observed on the growth side, while a plane derived from the bottom part of the metal particles and center lines formed along the cracks were observed on the peelable side. The fiber diameter (thickness) of the metal fiber was 11 μm as calculated by using the scales shown in these figures. The ratio of the maximum cross-sectional height H to the fiber diameter D at the cross-sectional surface of the metal fiber was calculated to be about 0.50. The number of pores per unit area was about 2000 mm$^{-2}$. The largest pore area observed was about 462 μm$^2$, while the ratio of the number of pores having pore areas not more than one-half of the largest pore area (i.e., not more than about 231 μm$^2$) to the number of the total pores was about 97%.

Example C3

Measurement of Aperture Ratio

The aperture ratio of the porous metal foil obtained in Example C1 was determined by weight method in the following manner. At the outset, the thickness of the porous metal foil was measured to be 6.4 μm by a digital length measuring system (Digimicro MH-15M manufactured by Nikon Corporation). In this measurement, MS-5C (manufactured by Nikon Corporation) was used as a measuring stand, while a spindle which is the standard equipment of Digimicro MH-15M was used. The unit weight per 100 mm×100 mm square of the foil was measured to be 0.450 g. On the other hand, the theoretical weight of a non-porous silver foil having a thickness of 6.4 μm and an area of 100 mm×100 mm square was calculated to be 0.672 g, using the silver density of 10.49 g/cm$^3$. With these values, the aperture ratio of the porous metal foil was calculated to be 33% as shown below.

$$\text{(Aperture ratio)} = 100 - [(\text{Unit weight of the sample})/$$
$$(\text{Theoretical weight of the non-porous silver foil})] \times 100 =$$
$$100 - [(0.450)/(0.672)] \times 100 = 33\%$$

The invention claimed is:

1. A reinforced porous metal foil comprising:
   a porous portion comprising a two-dimensional network structure composed of a metal fiber, wherein the metal fiber is a branched fiber, and wherein the branched fiber is irregularly networked; and
   a reinforced portion which is substantially non-porous or less porous than the porous portion, the reinforced portion being composed of the same metal as the metal fiber and being continuous and integral with the porous portion;
   wherein the reinforced portion is one of (a) provided as at least a part of an outer edge of the metal foil, (b) provided as outer edges along a longitudinal direction of the metal foil when the metal foil has an elongate shape, and (c) provided away from and in parallel with outer edges along a longitudinal direction of the metal foil when the metal foil has an elongate shape;
   wherein the porous portion has an aperture ratio P of 3 to 60%, and wherein the aperture ratio P is defined as:

$P=100-[(W_p/W_n)\times 100]$ wherein $W_p/W_n$ is a ratio of a weight $W_p$ of the porous portion to a theoretical weight $W_n$ of a non-porous metal foil having a composition and a size which are identical to those of the porous portion; and
   wherein the porous metal foil has a thickness of 3 to 40 μm.

2. The porous metal foil according to claim 1, wherein the reinforced portion is substantially non-porous.

3. The porous metal foil according to claim 1, wherein the metal fiber has a fiber diameter of 5 to 80 μm.

4. The porous metal foil according to claim 1, wherein the metal fiber is composed of numerous metal particles being connected to each other.

5. The porous metal foil according to claim 4, wherein the metal particles have hemispherical shapes having spherical parts and bottom parts, wherein the bottom parts of all the metal particles are positioned on a same basal plane, wherein the spherical parts of all the metal particles are positioned to a same side with reference to the basal plane.

6. The porous metal foil according to claim 1, wherein the two-dimensional network structure has an irregular shape derived from a crack, wherein the crack has been formed on a surface of a substrate.

7. The porous metal foil according to claim 1, wherein the metal fiber comprises at least one selected from the group consisting of copper, aluminum, gold, silver, nickel, cobalt, and tin.

8. The porous metal foil according to claim 1, wherein an average ratio of a maximum cross-sectional height H to a fiber diameter D of the metal fiber is 0.40 to 0.60.

9. A method for producing the reinforced porous metal foil according, to claim 1, comprising the steps of:
- preparing an electrically conductive substrate comprising a peelable layer, on a surface of which a crack is generated;
- bringing a contact member into contact with a part of the peelable layer and sliding the contact member thereon; and
- plating the peelable layer with a metal capable of depositing on the crack, to grow numerous metal particles along the crack in a region that has not been in contact with the contact member to form the porous portion, and to grow numerous metal particles so as to be denser than the metal particles in the porous portion in a region that has been in contact with the contact member to form the reinforced portion.

10. The method according to claim 9, wherein the contact member is a water-absorbing material containing water or aqueous liquid.

11. The method according to claim 9, further comprising the step of peeling off the porous metal foil from the peelable layer.

12. The method according to claim 11, further comprising the step of drying the peelable layer after the peeling-off step, wherein the dried peelable layer is subjected to the contacting step again.

13. The method according to claim 12, wherein the electrically conductive substrate provided with the peelable layer is configured in a form of a rotating drum, and wherein the contacting step, the plating step, the peeling-off step, and the drying step are sequentially repeated by rotating the electrically conductive substrate.

14. The method according to claim 9, wherein the peelable layer is composed of a metal or alloy of at least one selected from the group consisting of chromium and titanium, or an organic material.

* * * * *